(12) United States Patent
Song

(10) Patent No.: US 7,675,236 B2
(45) Date of Patent: Mar. 9, 2010

(54) PROJECTION DEVICE AND DISCHARGE LAMP THEREOF

(76) Inventor: Pei-Lun Song, 8F., No. 123-3, Sec. 1, Beiyi Rd., Sindian City, Taipei County 231 (TW)

( * ) Notice: Subject to any disclaimer, the term of this patent is extended or adjusted under 35 U.S.C. 154(b) by 298 days.

(21) Appl. No.: 11/373,881

(22) Filed: Mar. 10, 2006

(65) Prior Publication Data

US 2006/0202625 A1   Sep. 14, 2006

(30) Foreign Application Priority Data

Mar. 11, 2005   (TW) ............... 94107574 A

(51) Int. Cl.
 *H01J 61/54* (2006.01)
(52) U.S. Cl. .............. 313/595; 313/570; 313/25
(58) Field of Classification Search .......... 313/595, 313/25, 623, 113, 570
See application file for complete search history.

(56) References Cited

U.S. PATENT DOCUMENTS

| 5,811,933 A * | 9/1998 | Van Den Nieuwenhuizen et al. .............. 313/570 |
| 5,942,840 A * | 8/1999 | Steere et al. ............ 313/25 |
| 6,242,861 B1 * | 6/2001 | Nakagawa ............ 313/623 |
| 6,806,646 B2 * | 10/2004 | Lapatovich et al. ....... 313/595 |
| 2004/0095069 A1 * | 5/2004 | Yamashita et al. ......... 313/594 |

FOREIGN PATENT DOCUMENTS

| CN | 1383034 | 12/2002 |
| CN | 1409367 | 4/2003 |

* cited by examiner

*Primary Examiner*—Nimeshkumar D. Patel
*Assistant Examiner*—Mary Ellen Bowman
(74) *Attorney, Agent, or Firm*—Perkins Coie LLP

(57) ABSTRACT

A discharge lamp disposed in a projecting device is provided. The discharge lamp includes a housing, a discharge vessel and an ultraviolet (UV) source. The discharge vessel having a first axis is filled with a gas and disposed in the housing. The ultraviolet source disposed at a predetermined distance from the first axis for exciting the gas so as to generate a beam.

19 Claims, 4 Drawing Sheets

PROJECTION DEVICE AND DISCHARGE LAMP THEREOF

This application claims the benefit of Taiwan application Serial No. 094107574, filed Mar. 11, 2005, the subject matter of which is incorporated herein by reference.

BACKGROUND OF THE INVENTION

1. Field of the Invention

The invention relates in general to a projecting device, and more particularly to a projecting device having a discharge lamp.

2. Description of the Related Art

Discharge lamps have a large variety and are categorized into high-voltage mercury lamp, metal halogen lamp, low-voltage sodium lamp, and high-voltage sodium lamp. Take the high-voltage mercury lamp for example. The high-voltage mercury lamp illuminates by using a high voltage to form a strong electric arc between two electrodes and excite the gas ionization of the mercury or mercury compound inside the discharge vessel. The mercury atoms absorb the energy of the electrons and convert into electromagnetic waves radiated out. When the density of mercury is high enough, the radiated electromagnetic waves is re-absorbed by mercury atoms for jumping to greater energy level and visible light is released.

Conventional high-voltage mercury lamp uses a higher voltage of about 20 KV to ignite the lamp first, and then uses a lower voltage of about 70V to maintain the operation of the lamp. During the ionization process, electrons would be neutralized with the ions, and once the speed rate of the ions generation is smaller than that of ions neutralization, discharge process would not occur. Under cold lamp status, most of the mercury inside the discharge vessel condense into liquor; only a small proportion of mercury atoms exist in gas status. However, high voltage involves a larger extent of security concerns, but it is hard to generate an electric arc and ignite the lamp if the applied voltage is too low. Besides, the discharge lamps of any variety have a common drawback, that is, under hot lamp status, the lamp needs to be cooled down first before it is ignited again (hot-restrike). That's because gas discharge hardly occurs under a high air pressure. If a lamp which has just been turned off and is still under hot lamp status needs to be used again, the cooling time for hot-restrike exists necessarily to cool down from high temperature to recover a workable air pressure.

SUMMARY OF THE INVENTION

It is therefore the object of the invention to provide a projecting device. With an ultraviolet source being applied to a discharge lamp of the projecting device, the ignition probability is improved and the ignition time is shortened under both hot lamp status and cold lamp status.

According to an object of the invention, a discharge lamp disposed in a projecting device is provided. The discharge lamp includes a housing, a discharge vessel and an ultraviolet (UV) source. The discharge vessel having a first axis is filled with a gas and disposed in the housing. The ultraviolet source disposed at a predetermined distance from the first axis to excite the gas activation to generate a beam.

According to another object of the invention, a projecting device including a discharge lamp, an ultraviolet source and an optical machine is provided. The discharge lamp includes a housing and a discharge vessel. The discharge vessel having a first axis is filled with a gas and disposed in the housing. The ultraviolet source disposed at a predetermined distance from the first axis to excite the gas activation to generate a beam.

Other objects, features, and advantages of the invention will become apparent from the following detailed description of the preferred but non-limiting embodiments. The following description is made with reference to the accompanying drawings.

DETAILED DESCRIPTION OF THE INVENTION

The main concept of the invention is to dispose an ultraviolet source outside the discharge vessel of discharge lamp to add energy when igniting the lamp so as to increase the ignition probability of the discharge lamp under both the hot lamp status and the cold lamp status and shorten the ignition time. Despite the invention is exemplified by a preferred embodiment below, the scope of protection of the invention is not limited thereto.

Figure 1:
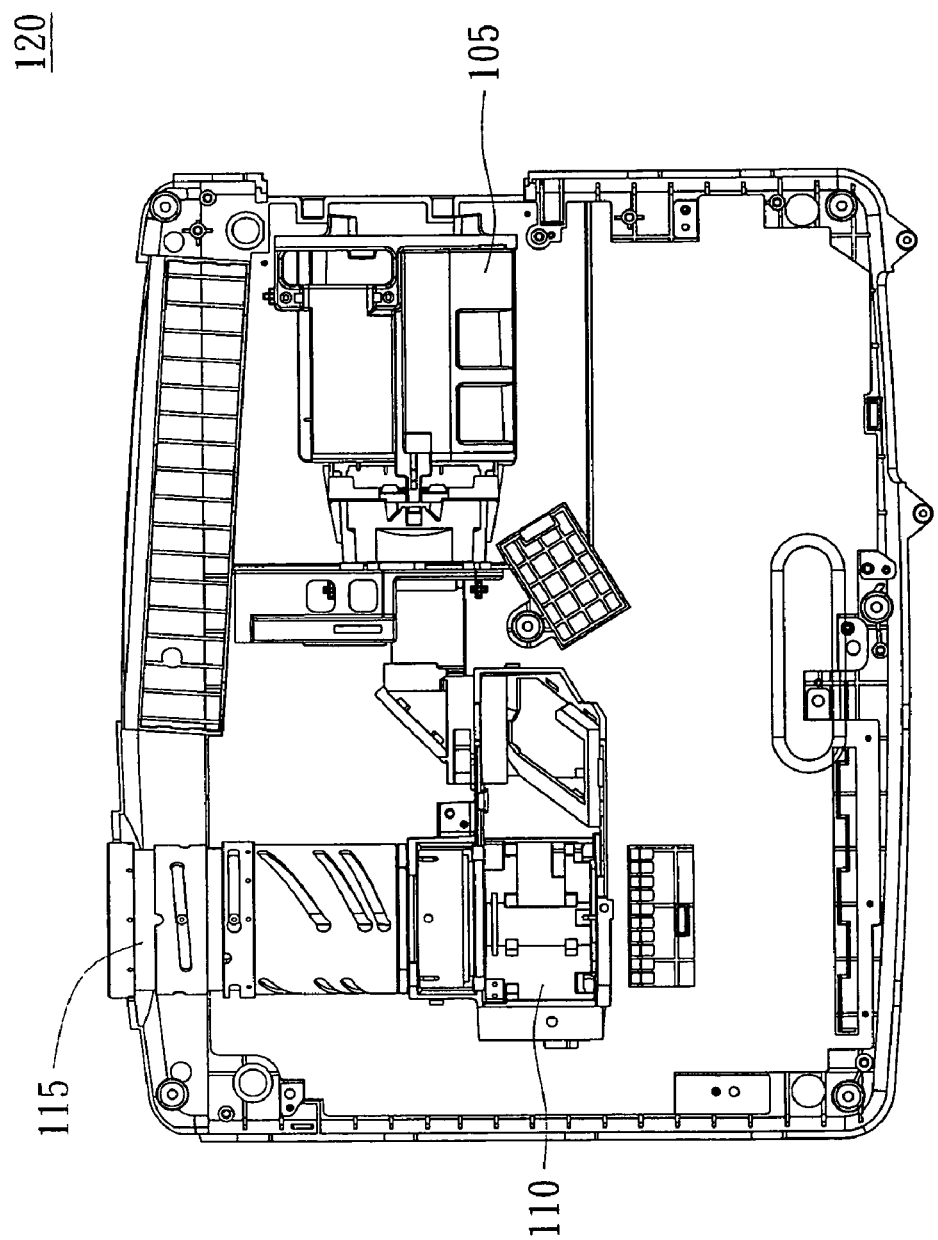
FIG. 1 is a top view showing the internal layout of a projecting device according to a preferred embodiment of the invention.

Referring to FIG. 1, a top view showing the internal layout of a projecting device according to a preferred embodiment of the invention is shown. Projecting device 120 of the present embodiment includes an illumination system 105 and an optical machine 110. The illumination system 105 includes at least a discharge lamp and an ultraviolet source. The ultraviolet source is for exciting the gas activation inside the discharge lamp to generate a beam. The optical machine 110 connects the illumination system 105 and receives the beam to form an image. The optical machine 110 includes a color wheel, a lens, a digital micromirror device (DMD) and a lens 115. After being differentiated into red, blue and green light by the color wheel, focused by the lens, and generated the contrast of brightness by the digital micromirror device (DMD), the beam generated by the illumination system 105 is enlarged and projected on a screen by the lens 115.

It is noteworthy that the ultraviolet source is for exciting the gas inside the discharge lamp and that the ultraviolet source is preferably disposed inside the discharge lamp. For example, the ultraviolet source is disposed inside the projecting device and towards the discharge vessel of the discharge lamp in the embodiment.

The discharge lamp of the present embodiment includes a housing, a discharge vessel and an ultraviolet source. The discharge vessel having a first axis is filled with a gas and disposed in the housing. The ultraviolet source disposed at a predetermined distance from the first axis excites the gas to generate a beam.

Figure 2:
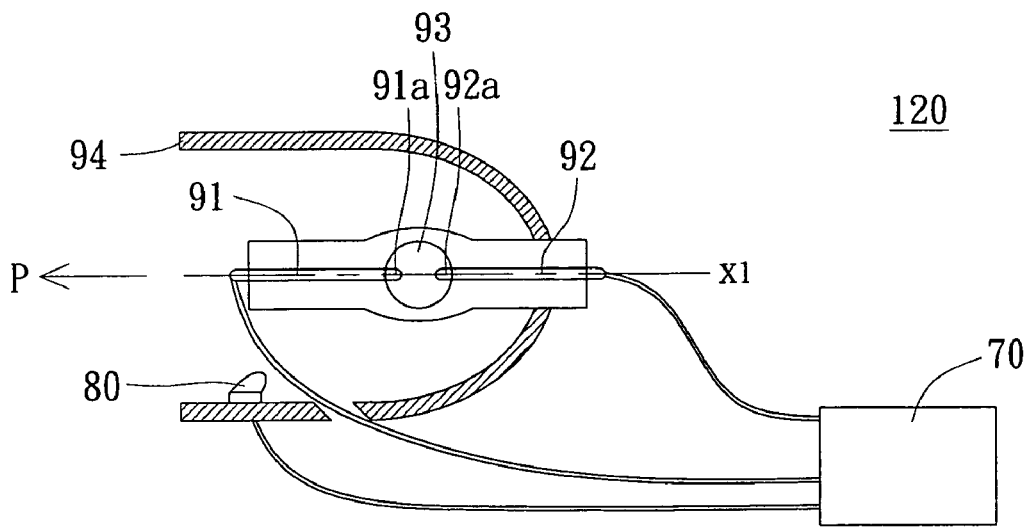
FIG. 2 is a partial cross-sectional view of a projecting device according to a preferred embodiment of the invention.

Referring to FIG. 2, a partial cross-sectional view of a projecting device according to a preferred embodiment of the invention is shown. In the projecting device 120, the discharge lamp includes a housing, a discharge vessel 93, and an ultraviolet source 80. The housing, which is preferably a reflector 94, encompasses the discharge vessel 93. The reflector 94 reflects the beam physically along an optical path P. The discharge vessel 93, having a first axis X1, is filled with a gas and disposed in the reflector 94. The discharge vessel 93 may be a glass container filled with gas for instance. The gas may be metal halogen, sodium or mercury. Preferably, the discharge vessel 93 is filled with mercury, mercury vapor or mercury compound. Since the discharge lamp illuminates according to the same theory, the invention is applicable to any discharge lamp and is not restricted to high-voltage mercury lamp.

The projecting device 120 further includes a first electrode 91, a second electrode 92 and an igniter 70. The igniter connects the discharge vessel 93. The igniter outputs a voltage to excite the gas to generate the beam. A first end 91a of the first electrode 91 and a second end 92a of the second electrode 92 opposite to the first 91a end are disposed inside the discharge vessel 93 along the first axis X1. The igniter 70 is electrically coupled to the first electrode 91 and the second electrode 92. When the igniter 70 applied a voltage to the first electrode 91 and the second electrode 92, the voltage forms an electric arc between the first end and the second end to excite the gas and result in gas discharge, so that the beam is generated.

Figure 3:
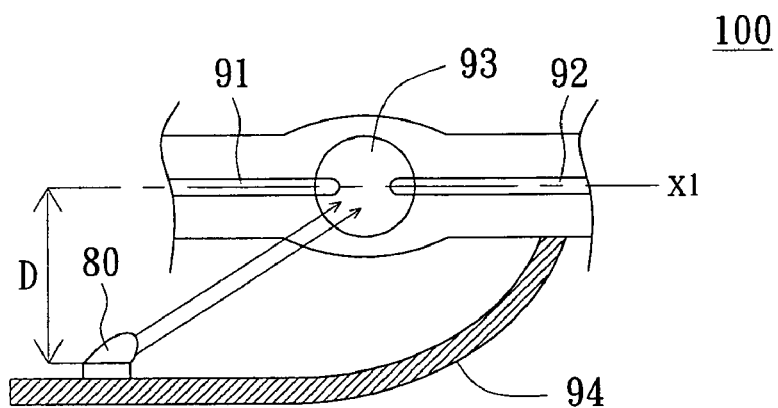
FIG. 3 is an enlarged view of an ultraviolet source and a discharge lamp of FIG. 2.

FIG. 3 is an enlarged view of an ultraviolet source and a discharge lamp of FIG. 2. An ultraviolet source 80 is disposed at a predetermined distance D from the first axis X1. For example, the ultraviolet source 80 may be disposed inside the housing, between the discharge vessel 93 and the reflector 94, on the reflector 94, or even be disposed outside the housing. Preferably, the ultraviolet source 80 is disposed adjacent to the discharge vessel 93 for emitting an ultraviolet light towards the discharge vessel 93 to excite the gas so that the beam is generated. On the other hand, the ultraviolet source 80 may be an ultraviolet light radioactive material or electronic device which produces UV depending on a power source, such as a light-emitting diode (LED) or the Laser. For example, in FIG. 2, the ultraviolet source 80 is preferably electrically connected to the igniter 70.

The ignition process of the present embodiment is disclosed below. Firstly, the ultraviolet source 80 is switched on and emits an ultraviolet light towards the discharge vessel 93. Next, the igniter 70 applies a voltage smaller than or equal to 20 kV to the first electrode 91 to form an intense electric arc between the first end 91a of the first electrode 91 and the second end 92a of the second electrode 92 and excite the gas ionization of the mercury or mercury compound inside the discharge vessel. With the energy provided by the ultraviolet light, the gas is excited and then the discharge lamp 100 is ignited with a lower initiating voltage.

Figure 4:
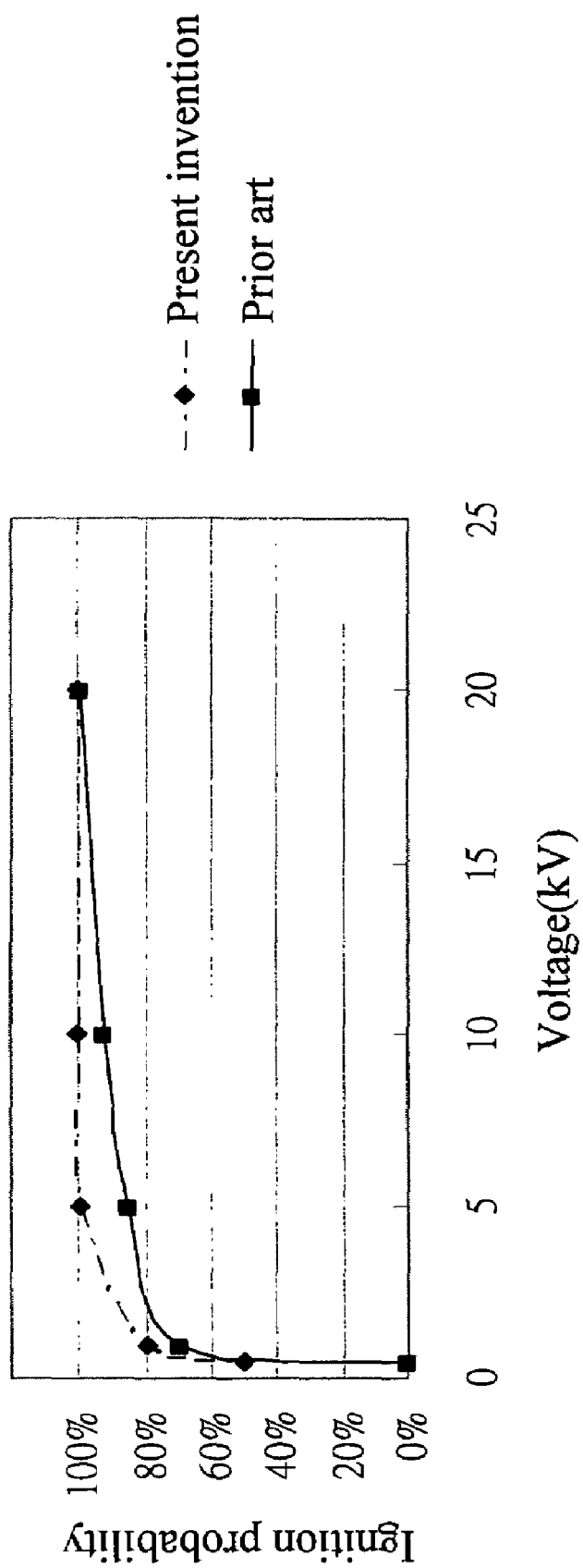
FIG. 4 shows the relationship between initiating voltage and ignition probability under clod lamp status comparing a conventional discharge lamp with a discharge lamp of the present embodiment respectively.
Figure 5:
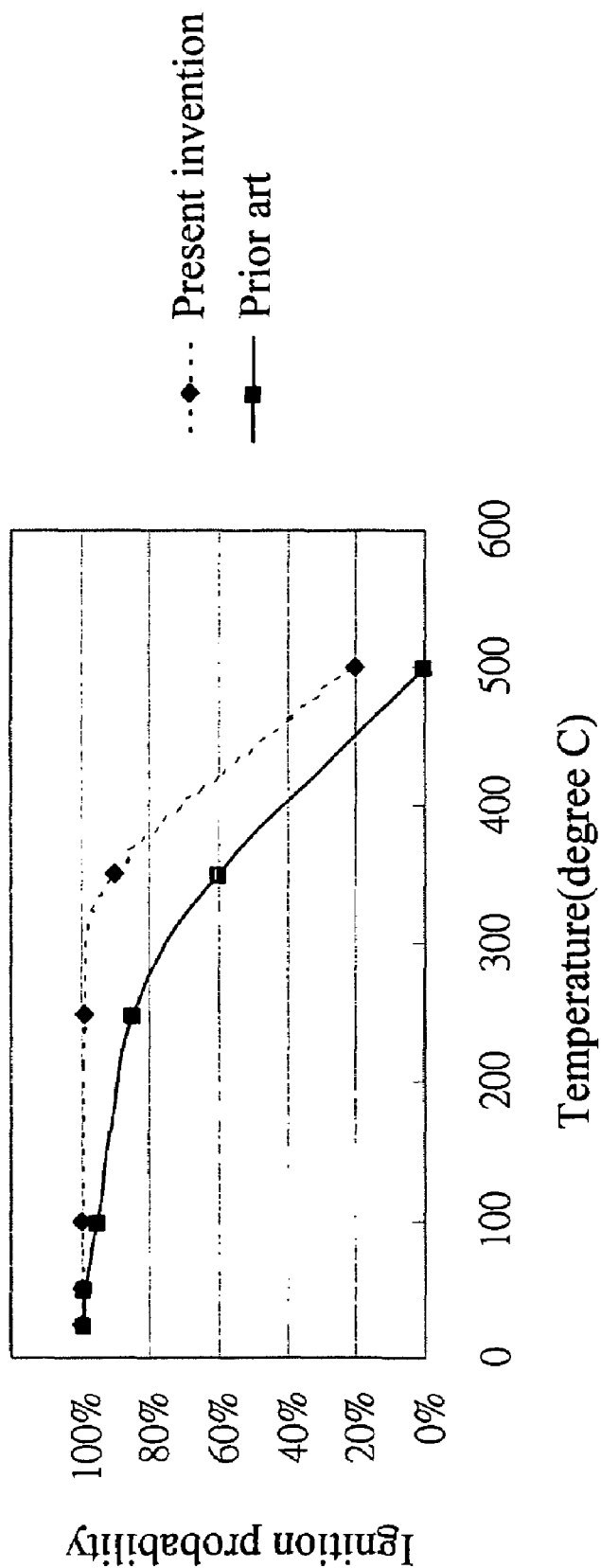
FIG. 5 shows the relationship between lamp temperature and ignition probability under hot lamp status comparing a conventional discharge lamp with a discharge lamp of the present embodiment respectively.

FIG. 4 and FIG. 5 are experimental data of the ignition probability under different statuses comparing the conventional discharge lamp with the discharge lamp of the present embodiment.

Experiment One: Ignition Probability Under Clod Lamp Status

In the experiment, various initiating voltages are applied to a cold discharge lamp under the room temperature (25° C.) whose predetermined initiating voltage is 20 KV, and the times of successful ignition of the discharge lamp are recorded to calculate the ignition probability. FIG. 4 shows the relationship between initiating voltage and ignition probability under clod lamp status comparing a conventional discharge lamp with a discharge lamp of the present embodiment respectively. It can be seen from FIG. 4 that under the same initiating voltage, the ignition probability of the discharge lamp of the present embodiment is larger than that of the conventional discharge lamp.

For a conventional discharge lamp under clod lamp status, a temperature of 25° C. for example, most of the mercury inside the discharge vessel condense into liquor; only a small proportions of mercury atoms exist in gas status. Therefore, the discharge vessel is not easy to be ignited with a low voltage; applying a high voltage is necessary for the gas to be excited and discharged. For example, when a voltage of about 20 KV is applied, the ignition probability approximates 100%. According to the present embodiment, when the discharge lamp is under cold lamp status, an ultraviolet source excites the gas inside the discharge vessel first, and then a voltage is applied to generate an electric arc. The ultraviolet source accelerates the ionization of the gas inside the discharge vessel, thereby increasing the ignition probability. For example, the ignition probability approximates 100% as long as the voltage is above 5 KV.

Experiment Two: Ignition Probability Under Hot Lamp Status

In the experiment, the ignition probability is measured from a just switched off discharge lamp under the conditions that the predetermined value of the initiating voltage is 20 KV and that the room temperature is 25° C. FIG. 5 shows the relationship between lamp temperature and ignition probability under hot lamp status comparing a conventional discharge lamp with a discharge lamp of the present embodiment respectively. It can be seen from FIG. 5 that under the same lamp temperature, the ignition probability of the discharge lamp of the present embodiment is larger than that of conventional discharge lamp.

The discharge lamp of the present embodiment enhances the ignition probability under hot lamp status. Generally speaking, the discharge lamp becomes hot after being used. Under the hot lamp status, i.e. the discharge lamp is just switched off, the discharge vessel is full of the gaseous molecules of the mercury. Applying the predetermined initiating voltage hardly results in a second gas discharge under high air pressure, because the gaseous molecules need larger energy to accomplish gas discharge. According to the present embodiment, when the discharge lamp of the present embodiment is under hot-restrike status, an ultraviolet light is applied to provide gaseous molecules extra energy before a voltage of 20 KV for instance is applied, so as to increase the ignition probability.

Furthermore, the discharge lamp of the present embodiment saves the cooling time for hot-restrike. As shown in FIG. 5, compared with the conventional discharge lamp, the discharge lamp of the present embodiment may achieve higher ignition probability under high temperature. That is to say, the discharge lamp of the present embodiment may be easier to ignite when the discharge lamp is under high temperature and high mercury vapor pressure, so as to save the cooling time for hot-restrike.

According to the projecting device and the discharge lamp thereof disclosed in above embodiment of the invention, an ultraviolet source is disposed outside the discharge vessel for providing extra energy during ignition, so that the ignition probability of the discharge lamp under both hot-restrike status and cold lamp status are increased, largely enhancing product quality and functions. Furthermore, the discharge lamp of the present embodiment only needs a lower initiating voltage when under cold lamp status and saves the cooling time for hot-restrike, further improving the convenience and promptness of the product.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A discharge lamp disposed in a projecting device, comprising:
a housing;
a discharge vessel disposed in the housing and having an axis, wherein the discharge vessel is configured to contain a gas;
an ultraviolet (UV) source disposed at a predetermined distance from the axis and configured to excite the gas;
a first electrode having a first end disposed inside the discharge vessel along the axis; and
a second electrode having a second end disposed inside the discharge vessel along the first-axis and opposite to the first end, wherein the first and second electrodes are configured to receive a voltage to excite the gas and form a beam, and wherein the voltage is greater than 10 kV.

2. The discharge lamp of claim 1 wherein the housing is a reflector encompassing the discharge vessel, and wherein the reflector is configured to reflect the beam along an optical path.

3. The discharge lamp of claim 1 wherein the ultraviolet source is disposed inside the housing.

4. The discharge lamp of claim 3 wherein the ultraviolet source is disposed adjacent to the discharge vessel.

5. The discharge lamp of claim 3 wherein the ultraviolet source is disposed between the discharge vessel and the reflector.

6. The discharge lamp of claim 3 wherein the ultraviolet source is disposed on the reflector.

7. The discharge lamp of claim 1 wherein the ultraviolet source is disposed outside the housing.

8. The discharge lamp of claim 1 wherein the ultraviolet source is an ultraviolet radioactive material.

9. The discharge lamp of claim 1 wherein the ultraviolet source is an ultraviolet light-providing electronic device.

10. The discharge lamp of claim 1 wherein the gas is a mercury vapor.

11. A projecting device, comprising:
a discharge lamp, including:
a housing;
a discharge vessel disposed in the housing and having an axis, wherein the discharge vessel is configured to hold a gas;
a first electrode having a first end disposed inside the discharge vessel along the axis; and
a second electrode having a second end disposed inside the discharge vessel along the axis and opposite to the first end;
an ultraviolet source disposed at a predetermined distance from the axis and configured to excite the gas;
an igniter coupled to the first electrode and the second electrode, wherein the igniter is configured to output a voltage to further excite the gas and to form a beam of light, wherein the voltage is greater than 10 kV; and
an optical machine coupled to the discharge lamp, wherein the optical machine is configured to receive the beam and form an image.

12. The projecting device claim 11 wherein the housing is a reflector encompassing the discharge vessel, and wherein the reflector is configured to reflect the beam to into the optical machine along an optical path.

13. The projecting device of claim 11 wherein the ultraviolet source is disposed inside the housing.

14. The projecting device claim 13 wherein the ultraviolet source is disposed adjacent to the discharge vessel.

15. The projecting device of claim 13 wherein the ultraviolet source is disposed between the discharge vessel and the reflector.

16. The projecting device of claim 13 wherein the ultraviolet source is disposed on the reflector.

17. The discharge lamp claim 11 wherein the ultraviolet source is disposed outside the housing.

18. The projecting device of claim 11 wherein the gas is a mercury vapor.

19. A discharge lamp comprising a vessel disposed within a housing, wherein the discharge vessel is configured to contain a gas, the discharge lamp comprising:
a first electrode and a second electrode inside the vessel;
means for exciting the gas with UV energy; and
means for providing a voltage greater than 10 kV to the first and second electrodes to form a light beam.

* * * * *